March 12, 1968 N. F. ELICH 3,372,723
APPARATUS FOR SEPARATING FISH MEAT FROM BONES
Filed Sept. 13, 1965 2 Sheets-Sheet 1
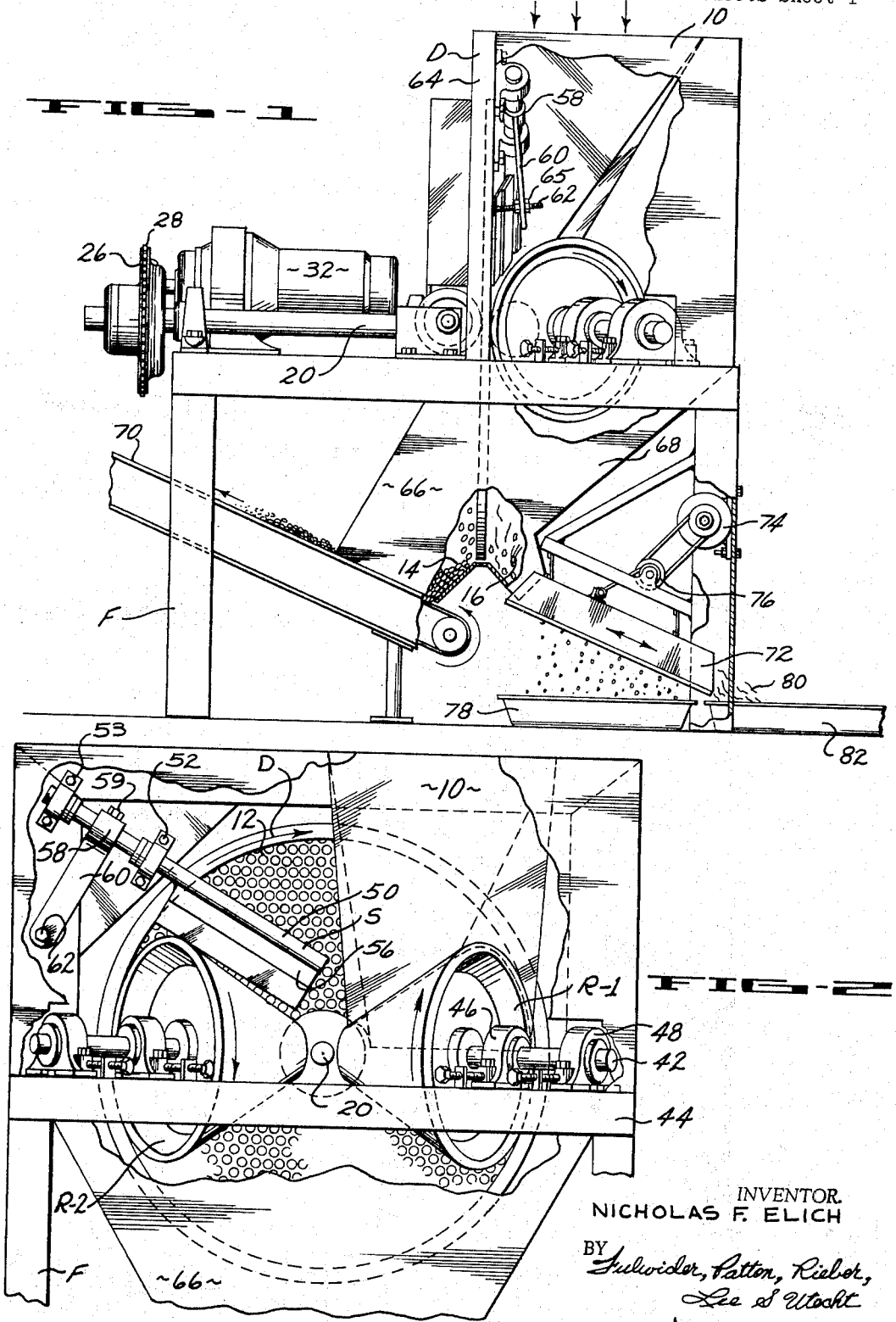
INVENTOR.
NICHOLAS F. ELICH
BY
ATTORNEYS

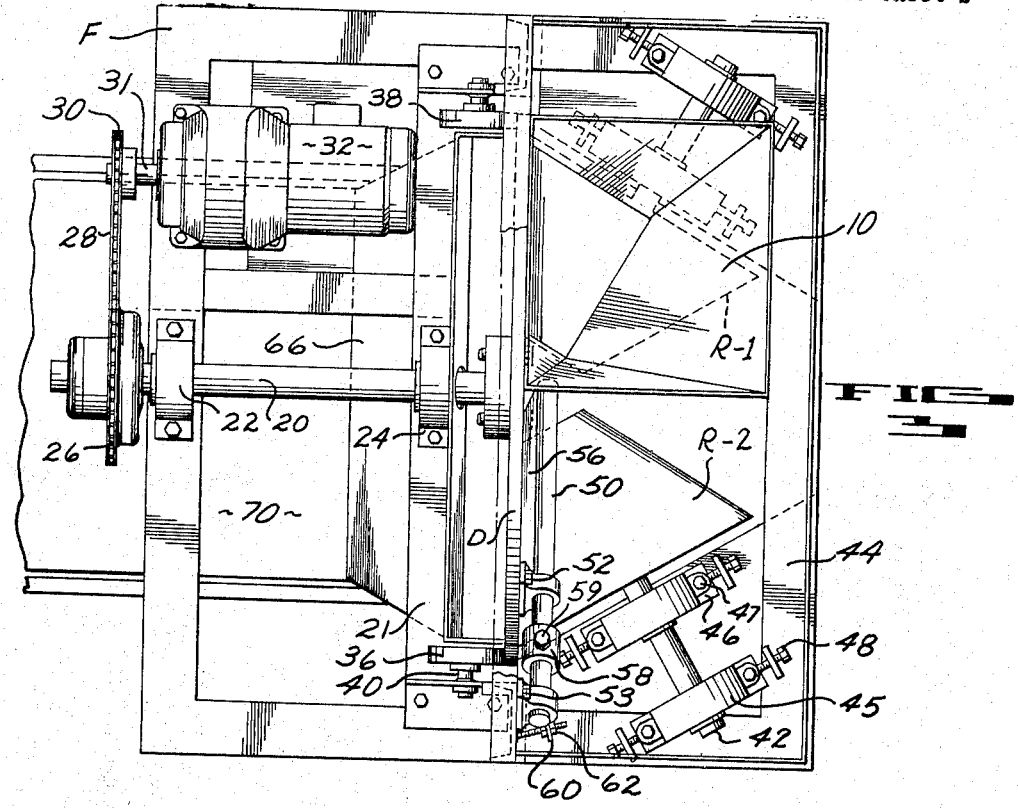

United States Patent Office 3,372,723
Patented Mar. 12, 1968

3,372,723
APPARATUS FOR SEPARATING FISH MEAT FROM BONES
Nick F. Elich, San Pedro, Calif., assignor to Star-Kist Foods, Inc., Terminal Island, Calif., a corporation of California
Filed Sept. 13, 1965, Ser. No. 486,605
3 Claims. (Cl. 146—76)

ABSTRACT OF THE DISCLOSURE

Apparatus for separating fish meat from bones utilizing a frame whereon is mounted a disc formed with a plurality of apertures smaller in width than the length of the bones. The disc is power-operated. A pair of frusto-conical pressing rollers are rotatably supported on the frame, with the sides of the rollers abutting the front of the disc. Rotation of the disc effects concurrent rotation of the rollers. The angular relationship between the rollers and the disc is so selected that during rotation of the disc and the rollers the contacting surfaces of the disc and the rollers will move at substantially the same speed. A pair of back-up rollers are supported on the frame behind the pressing rollers in abutment with the rear surface of the disc to be rotated by the disc. A scraper is supported by the frame in engagement with the front surface of the disc to remove the bones from the front of the disc, with the fish meat being forced through the disc apertures. Preferably, a shaker table is disposed below the front of the disc to effect removal of any meat remaining on the bones scraped off the front of the disc.

---

The present invention relates generally to the art of material separation and more particularly a new and novel apparatus for separating meat from bones.

It is a major object of the present invention to provide apparatus that is particularly useful for separating fish meat from fish bones whereby the meat may be rendered eatable.

It is another object of the present invention to provide apparatus of the aforedescribed nature which is considerably more efficient than previous devices of this type.

Yet another object of the present invention is to provide apparatus of the aforedescribed nature which is simple in design and rugged of construction whereby it may afford a long and useful service life, even when subjected to the rigorous working conditions present in a conventional fish cannery.

Yet another object of the present invention is to provide apparatus of the aforedescribed nature utilizing a rotatable apertured disc against which are pressed frusto-conical roller means, with the contacting surfaces of such discs and roller means rolling together at substantially the same speed whereby minimum wear takes place between such surfaces.

Another object of the present invention is to provide apparatus of the aforedescribed nature that employs a scraper which removes accumulated material from the surfaces of the perforated disc, with the pressure exerted by such scraper against the disc being readily adjustable.

Yet an additional object of the present invention is to provide apparatus of the aforedescribed nature that is economical to construct and to maintain.

These and other objects and advantages of the present invention will become apparent from the following detailed description, when taken in conjunction with the appended drawings wherein:

FIG. 1 is a side elevational view of a preferred form of apparatus embodying the present invention;

FIG. 2 is a broken front view of said apparatus;
FIG. 3 is a top plan view of said apparatus; and
FIG. 4 is a broken rear elevational view of said apparatus.

Referring to the drawings, a preferred form of apparatus embodying the present invention includes a rigid frame F whereon is vertically mounted an apertured disc D for rotation about a horizontal axis. A pair of frusto-conical pressing rollers $R_1$ and $R_2$ are carried by the frame F for rotational abutment against the front surface of the apertured disc D. A fish-receiving supply hopper 10 is formed in the upper right-hand portion of the frame F as viewed in FIG. 2. Fish dropped into hopper 10 will initially be tightly pressed against the front surface of the apertured disc D by roller $R_1$. Any fish parts remaining on the front surface of the apertured disc D will thereafter be pressed against the front surface of the disc D by the roller $R_2$. A scraper S is mounted above the roller $R_2$, with such scraper being in abutment with the front surface of the apertured disc D. The engagement of the sides of rollers $R_1$ and $R_2$ with the front surface of the apertured disc D will serve to force fish meat 14 into and through the apertures 12 of the disc, with the fish bones 16 being scraped off the front surface of the disc by means of the scraper S, as shown in FIG. 1.

More particularly, the apertured disc D is keyed to a horizontal shaft 20 supported upon a cross-piece 21 of frame F by pillow blocks 22 and 24. The rear portion of the shaft 20 is keyed to a driven sprocket 26 that is encircled by a drive chain 28. Drive chain 28 extends around a drive sprocket 30 that is keyed to the shaft 31 of a conventional electric motor 32 mounted upon the frame F.

The outer periphery of the rear surface of the apertured disc D engages a pair of back-up rollers 36 and 38. The back-up rollers 36 and 38 are rotatably supported upon the side members of the frame F by means of horizontal shafts 40. As indicated in FIGS. 1 and 3, the back-up rollers 36 and 38 are arranged in a horizontal plane diametrically opposite one another relative to the front surface and rotate about an axis of rotation normal to that of disc D. The disc D is preferably formed of a hard corrosion-resistant metal.

The frusto-conical pressing rollers $R_1$ and $R_2$ are of like construction and are similarly mounted relative to the frame F. Each roller is keyed to a horizontal shaft 42 that is rotatably supported by a pair of pillow blocks 45 and 46 secured to crosspiece 44 by bolt and nut combinations 47. Preferably, the latter are disposed in elongated slots (not shown) whereby the position of the pillow blocks may be varied by means of adjusting screws 48 secured to crosspiece 44. Preferably, each roller $R_1$ and $R_2$ will be formed of a steel body that is covered with a layer of natural or synthetic rubber.

It should be particularly noted that the angular relationship between the sides of the frusto-conical pressing rollers $R_1$ and $R_2$ and the axes of rotation of such rollers relative to the axis of rotation of the apertured disc D should be so selected that during rotation of the disc and the pressing rollers, the contacting surfaces between the disc and the pressing rollers will move at substantially the same speed along the length of the sides of the rollers. In this manner, little if any slippage will take place between these contacting surfaces. Such slippage is to be avoided in order to obtain maximum wear of these contacting members.

It will be apparent from the drawings that both the upper end and the rear end of the fish-receiving hopper 10 are open, whereby fish dropped through the upper end of the hopper 10 will be pressed against the front surfaces of the apertured disc D by the roller $R_1$.

The scraper S includes a support bar 50 that is pivotably supported within a pair of pillow blocks 52 and 53. The inner pillow block 52 is affixed to a triangular gusset 54, while outer pillow block 53 is affixed to a frame upright 55. Gusset 54 is carried by the upright 55. An elongated steel plate 56 is rigidly affixed to the bar 50 as by welding inwardly of the innermost pillow block 52. The free end of this plate 56 engages the front surface of the apertured disc D. The section of the bar 50 between the pillow blocks 52 and 54 is keyed to a collar 58 as by a screw 59. The lower side of collar 58 is rigidly affixed to a resilient adjustment finger 60, as shown particularly in FIGURE 1. With continued reference to this figure, the free end of the adjustment finger 60 carries an adjustment bolt 62, the rear end of which abuts the front surface of an upright element 64 of the frame F. A pair of lock nuts 65 control the setting of the adjustment bolt 62 relative to finger 60. The angularity between the adjustment finger 60 and the scraper plate 56 relative to the bar 50 should be so chosen that the free edge of the scraper plate 56 is constantly resiliently biased against the front surface of the apertured disc D, with the force of such engagement being controlled by rotation of the adjustment bolt 62 within lock nut 65.

The frame F is provided with a fish meat-receiving hopper 66, such hopper being formed rearwardly of the apertured disc D and extending across the width thereof. Referring to FIGURE 1, the frame F is also provided with a fish bone-receiving hopper 68 forwardly of the apertured disc D and below rollers $R_1$ and $R_2$. The open lower end of the fish meat-receiving hopper 66 is aligned with the lower portion of an endless conveyor belt 70. The open lower end of the fish bone-receiving hopper 68 is in communication with a conventional shaker table 72, such shaker table being vibrated in a well-known manner by means of an electric motor 74 and a vibrator unit 76. Both motor 74 and vibrator unit 76 are carried by the lower portion of the frame F below roller $R_2$. The shaker table 72 is apertured whereby any fish meat remaining upon the bones 16 removed from the front surface of the apertured disc by the scraper S will fall into a first container 78. The remaining fish bones 80 will move downwardly and forwardly along the upper surface of the shaker table 72 into a second container 82.

In operation of the aforedescribed apparatus, rotation of the apertured disc D by electric motor 32 will effect concurrent rotation of the pressing rollers $R_1$ and $R_2$ because of the frictional engagement of their contacting surfaces. The back-up rollers 36 and 38 afford support for the disc D against the rearward forces developed by contact between the pressing rollers $R_1$ and $R_2$ and the front surface of the disc D. Fish dropped into the supply hopper 10 will be pressed against the front surface of the disc D by the pressing roller $R_1$. The pressure applied by roller $R_1$ will cause most of the fish meat to be forced into and rearwardly through the apertures 12 of disc D. This meat will fall into the confines of the fish meat-receiving hopper 66 and will be removed therefrom on the conveyor belt 70.

The fish bones are longer than the width of apertures 12 and hence will not enter the apertures 12. Instead, such bones will be carried by the disc D in a clockwise direction, with respect to FIGURE 2, until they are removed from the disc by scraper S. Any fish meat remaining on the disc D after the latter rotates past roller $R_1$ will again be pressed into contact with the front surface of the disc D by the second pressing roller $R_2$. Roller $R_2$ will substantially complete the fish meat-removing operation started by roller $R_1$ by forcing such meat into and through the apertures 12 of disc D. This meat will also fall into the fish meat-receiving hopper 66.

The engagement of the fish bones and any fish skin remaining on the front surface of disc D with the free end of plate 56 of the scraper S will cause such material to fall downwardly into the fish bone-receiving hopper 68. As indicated hereinbefore, a slight quantity of fish meat may remain on the front surface of the disc D moving past the roller $R_2$. This fish meat will also be scraped off the front surface of the disc D and fall downwardly into the fish bone-receiving hopper 68. In the manner indicated hereinbefore, this remaining fish meat will be separated from the fish bones by shaker table 72 and deposited within the first container 78. The fish bones will move off the bottom of the shaker table 72 and into the second container 82. It will be apparent that conveyor belts or the like may be substituted for containers 78 and 82.

The pressure applied by the free end of the plate 56 of scraper S is adjusted by means of the adjustment bolt 62. It should be noted that if the scraper plate 56 is too loose relative to the front surface of the disc D, fish bones will build up on the scraper and may find their way into the fish meat. Accordingly, it is important that the pressure applied by plate 56 against the front surface of the disc D can be adjusted. This feature is also important since the scraper plate 56 should be periodically sharpened. When sharpened, such plate undergoes a reduction in width thereby requiring a new adjustment when it is reinstalled in condition for operation.

It should be noted that the frusto-conical pressing rollers $R_1$ and $R_2$ may be advanced towards the front surface of disc D by means of the aforementioned adjusting screws 48. This feature affords compensation for any wear of the rubber layer of such rollers.

The apparatus described hereinabove has proven to be extremely efficient and foolproof in actual operation in a fish cannery. Such apparatus eliminates much tedious manual labor in separating fish meat from fish bones and can obtain better results than is possible where human skill is employed to pick the bones out of the meat.

Various modifications and changes may be made with respect to the foregoing detailed description without departing from the spirit of the present invention or the scope of the following claims.

I claim:

1. Apparatus for separating meat from bones, comprising:
   a frame;
   a disc rotatably supported on said frame, said disc being formed with a plurality of apertures that are smaller in width than the length of said bones;
   power-operated means on said frame that rotate said disc;
   frusto-conical pressing roller means rotatably supported on said frame, with the sides of said roller means abutting the front of said disc whereby rotation of said disc effects concurrent rotation of said pressing roller means, and the angular relationship between said roller means and said disc being so selected that during rotation of said disc and said roller means the contacting surfaces of said disc and roller means will move at substantially the same speed along the length of said sides;
   back-up roller means on said frame directly behind said pressing roller means in abutment with the rear surface of said disc to be rotated by said disc;
   and a scraper supported by said frame in engagement with the front surface of said disc.

2. Apparatus as set forth in claim 1 wherein said pressing roller means comprises a pair of rollers arranged opposite one another relative to the front surface of said apertured disc and said back-up roller means comprises a pair of rollers, each mounted behind one of said pressing rollers.

3. Apparatus as set forth in claim 1 wherein the sides of said pressing roller means are covered with rubber and said pressing roller means may be adjusted toward the front of said disc as said rubber is worn away.

4. Apparatus as set forth in claim 1 wherein the pressure of the engagement of said scraper against the front surface of said disc is adjustable.

5. Apparatus as set forth in claim 1 wherein an apertured shaker table is supported by said frame below said scraper.

6. Apparatus as set forth in claim 2 wherein the sides of said pressing roller means are covered with rubber and pressing roller means may be adjusted toward the front of said disc as said rubber is worn away.

7. Apparatus as set forth in claim 2 wherein the pressure of the engagement of said scraper against the front surface of said disc is adjustable.

8. Apparatus as set forth in claim 3 wherein the pressure of the engagement of said scraper against the front surface of said disc is adjustable.

References Cited

UNITED STATES PATENTS

| | | | |
|---|---|---|---|
| 3,032,087 | 5/1962 | Rodwick | 146—125 |
| 501,417 | 7/1893 | Grether | 146—175 |
| 506,746 | 10/1893 | Stearnes | 146—175 |
| 732,900 | 7/1903 | Schlussel | 146—175 |
| 1,244,774 | 10/1917 | Pointe | 146—174 X |
| 2,846,944 | 8/1958 | Willmes et al. | 100—153 |

FOREIGN PATENTS 283,376   3/1931   Italy.

W. GRAYDON ABERCROMBIE, *Primary Examiner.*